(12) United States Patent
Herden et al.

(10) Patent No.: US 7,845,328 B2
(45) Date of Patent: Dec. 7, 2010

(54) OPTICAL DISTRIBUTOR FOR A LASER-BASED IGNITION SYSTEM, AND METHOD FOR THE OPERATION THEREOF

(75) Inventors: Werner Herden, Gerlingen (DE); Manfred Vogel, Ditzingen (DE); Heiko Ridderbusch, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/301,193

(22) PCT Filed: Jun. 4, 2007

(86) PCT No.: PCT/EP2007/055435

§ 371 (c)(1),
(2), (4) Date: May 12, 2009

(87) PCT Pub. No.: WO2007/147719

PCT Pub. Date: Dec. 27, 2007

(65) Prior Publication Data

US 2010/0024755 A1     Feb. 4, 2010

(30) Foreign Application Priority Data

Jun. 20, 2006   (DE)   .................... 10 2006 028 274

(51) Int. Cl.
*G02B 6/35* (2006.01)
*G02B 6/42* (2006.01)

(52) U.S. Cl. .................. 123/143 B; 372/108; 385/16; 385/32; 385/50

(58) Field of Classification Search ............. 123/143 B; 372/10, 12, 25, 69, 108, 109; 385/16, 31, 385/32, 50, 147
See application file for complete search history.

(56) References Cited

U.S. PATENT DOCUMENTS

| | | | |
|---|---|---|---|
| 3,895,612 A * | 7/1975 | Keely et al. | 123/477 |
| 4,753,501 A * | 6/1988 | Battle | 385/22 |
| 4,896,935 A * | 1/1990 | Lee | 385/22 |
| 5,920,667 A | 7/1999 | Tiao et al. | |
| 6,351,579 B1 * | 2/2002 | Early et al. | 385/18 |
| 6,380,822 B1 * | 4/2002 | Lindgren | 333/106 |
| 6,382,957 B1 * | 5/2002 | Early et al. | 431/1 |
| 6,778,729 B1 * | 8/2004 | Guy | 385/22 |

(Continued)

FOREIGN PATENT DOCUMENTS

EP            0 927 894         7/1999

(Continued)

OTHER PUBLICATIONS

International Search Report, PCT/EP2007/055435, dated Aug. 28, 2007.

*Primary Examiner*—Erick Solis
(74) *Attorney, Agent, or Firm*—Kenyon & Kenyon LLP

(57) ABSTRACT

An optical distributor for the distribution of light, in particular laser light, between at least one optical input and at least one of several optical outputs includes at least one movably disposed light guide and a positioning member for moving the at least one light guide, the movably disposed light guide being movable by the positioning member such that at least one of the optical inputs is connectable via the light guide to at least one of the optical outputs.

19 Claims, 5 Drawing Sheets

U.S. PATENT DOCUMENTS

| | | | |
|---|---|---|---|
| 6,802,290 | B1 | 10/2004 | Wintner et al. |
| 7,114,858 | B2 * | 10/2006 | Gupta et al. ............. 385/88 |
| 7,421,166 | B1 * | 9/2008 | Woodruff et al. ............ 385/39 |
| 2006/0037572 | A1 | 2/2006 | Yalin et al. |

FOREIGN PATENT DOCUMENTS

| | | |
|---|---|---|
| JP | 57-6805 | 1/1982 |
| WO | WO 02/056096 | 7/2002 |
| WO | WO 02/081904 | 10/2002 |

\* cited by examiner

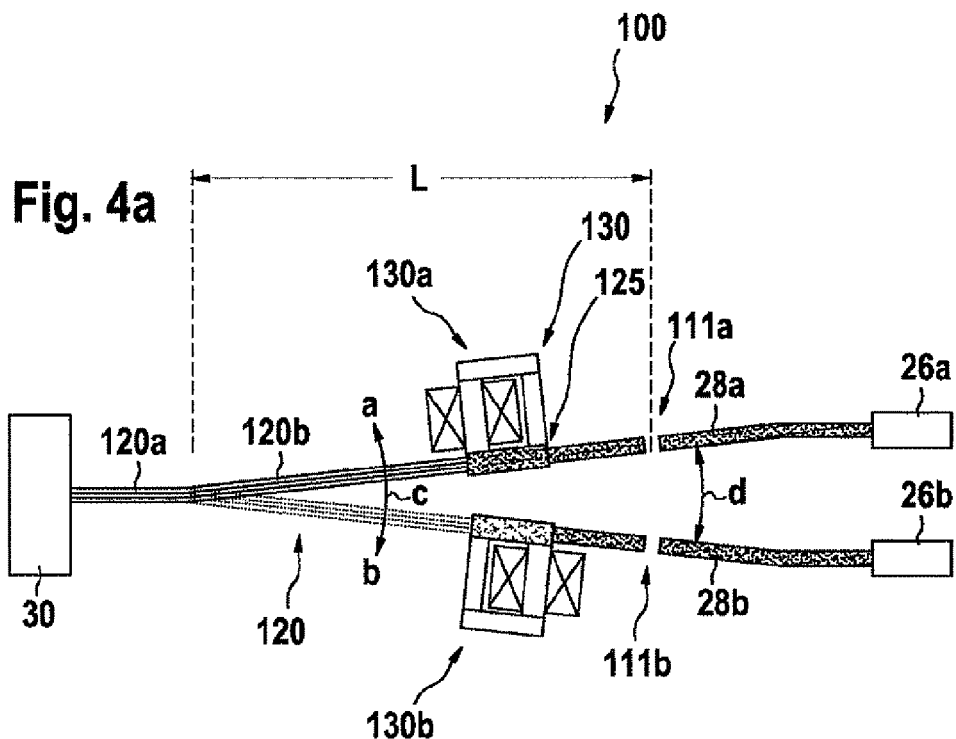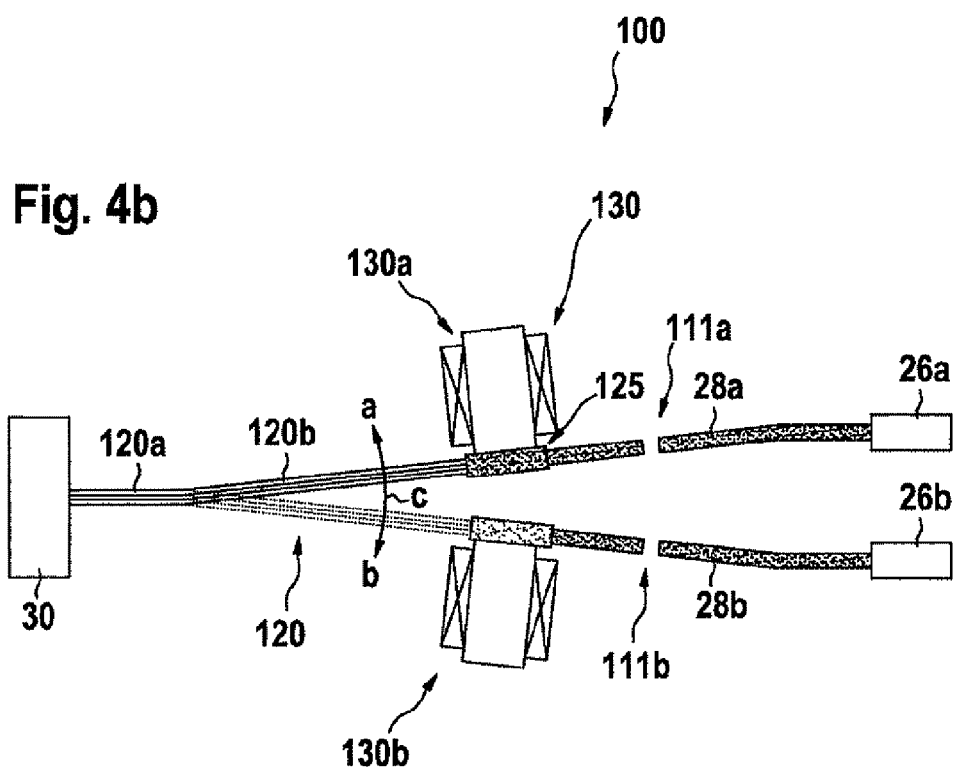

OPTICAL DISTRIBUTOR FOR A LASER-BASED IGNITION SYSTEM, AND METHOD FOR THE OPERATION THEREOF

FIELD OF THE INVENTION

The invention relates to an optical distributor for the distribution of light, in particular laser light, between at least one optical input and at least one of several optical outputs.

The present invention further relates to an operating method for an optical distributor of this kind.

BACKGROUND INFORMATION

Optical distributors are known from the field of optical information technology, in particular as so-called fiber-optic power splitters that apportion radiant power from an input fiber to a plurality of output fibers. A disadvantage with such fiber-optic power splitters is, in particular, the fact that the radiant power delivered to the output fibers is usually orders of magnitude lower than the radiant power present in the input fiber.

In addition to such fiber-optic power splitters, which usually have a discrete construction, distributed coupler structures are also known, in which apportioning of the radiant power from the input fiber to the output fibers is accomplished over a more or less physically extended region.

In addition to these basic types of optical power splitters or distributors, further coupler structures are also known from optical information technology, for example polished fiber couplers, melt couplers, and the like.

All these known couplers or optical distributors have a relatively complex construction, entail correspondingly high production costs, and moreover are unsuitable for use in the motor vehicle sector or in other operating environments with particularly difficult environmental conditions such as, for example, vibration, large temperature fluctuations, and the like.

SUMMARY

Example embodiments of the present invention provide an optical distributor of the kind cited above, and an operating method therefor, so as to yield a simple, comparatively economical construction and at the same time to guarantee flexible usability even under difficult environmental conditions.

According to example embodiments of the present invention, an optical distributor has at least one movably disposed light guide and a positioning member for moving the at least one light guide, the movably disposed light guide being movable by the positioning member such that at least one of the optical inputs is connectable via the light guide to at least one of the optical outputs.

The light guide disposed movably according to example embodiments of the present invention, and the positioning member provided for movement thereof, make possible, with comparatively little design complexity, flexible forwarding or distribution of light, or of optical radiant power in general, between one or more inputs and one or more outputs of the optical distributor.

In contrast to the optical distributors or power splitters known from optical information technology, the optical distributor according to example embodiments of the present invention is based largely on components that can be designed correspondingly robustly for use, for example, in the motor vehicle sector, and that can be manufactured economically and are low-maintenance.

A further particular advantage of the optical distributor according to example embodiments of the present invention is that because of the movably disposed light guide for distribution of the radiant power, almost no transfer of radiant power takes place outside the light guide or outside the optical inputs and outputs. The transfer of radiant power via "open" light paths, for example air-filled regions between two fiber ends, is therefore minimal, resulting overall in an extremely low-loss configuration.

Further features, potential applications, and advantages of example embodiments of the present invention are described in the description below of exemplifying embodiments that are depicted in the Figures of the drawings. All features described or depicted, of themselves or in any combination, constitute the subject matter hereof, irrespective of their grouping or their internal references, and irrespective of their presentation and depiction in the description and the drawings, respectively.

BRIEF DESCRIPTION OF THE DRAWINGS

FIG. 2b is a detail view of a movable light guide of the optical distributor of FIG. 2a;

FIGS. 4a to 5b show further example embodiments of the optical distributor; and

DETAILED DESCRIPTION

Figure 1:
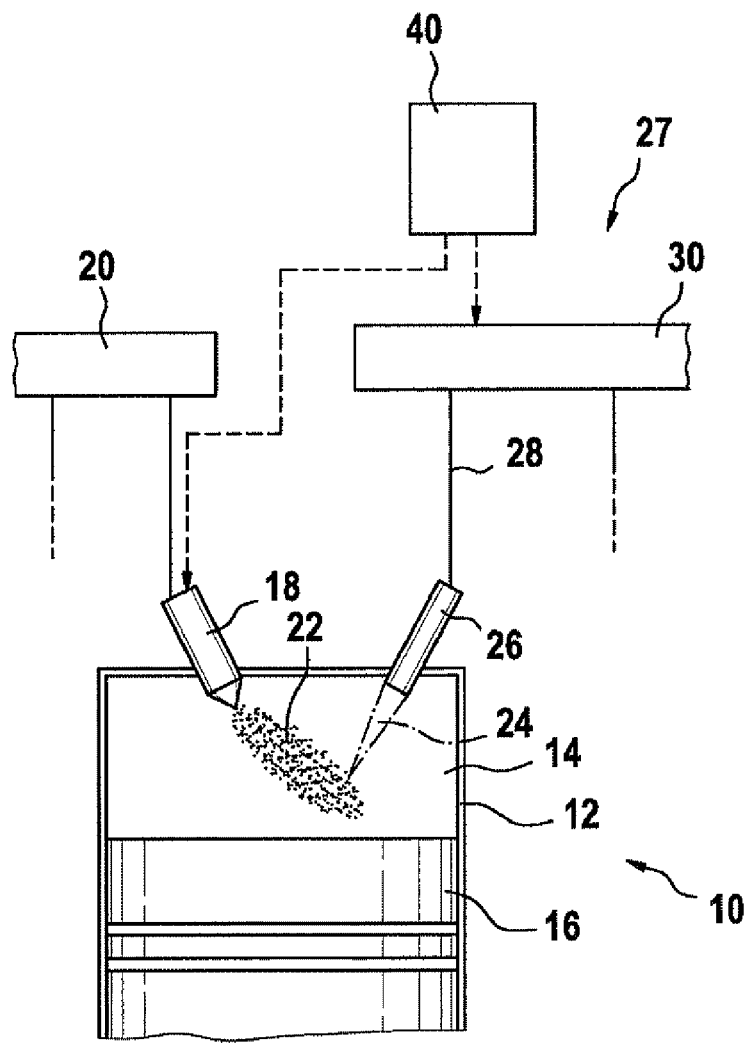
FIG. 1 schematically depicts a laser-based ignition system of an internal combustion engine.

FIG. 1 schematically shows an internal combustion engine 10 that serves to drive a motor vehicle (not illustrated in FIG. 1). Internal combustion engine 10 encompasses for this purpose several cylinders, only one of which is depicted in FIG. 1 and is labeled with the reference character 12. A combustion chamber 14 of cylinder 12 is delimited by a piston 16. Fuel travels into combustion chamber 14 directly through an injector 18 that is connected to a pressurized fuel reservoir 20 also referred to as a rail or common rail.

Internal combustion engine 10 illustrated in FIG. 1 has a laser-based ignition system 27 in which a fuel quantity 22 injected into combustion chamber 14 is ignited by way of a laser beam or a laser pulse 24. Laser pulse 24 is emitted into combustion chamber 14 by way of a laser device 26 associated with cylinder 12. Laser device 26 is a constituent of laser-based ignition system 27 which, in addition to further decentralized laser devices (i.e. associated with different cylinders), said devices not being shown, also has a centralized laser light source 30, for example a semiconductor laser, as well as an optical distributor (not illustrated in FIG. 1) according to example embodiments of the present invention, which distributes laser light from centralized laser light source 30 to decentralized laser devices 26. The optical distributor according to the present invention can, for example, be integrated into centralized laser light source 30.

Control of laser-based ignition system 27 and centralized laser light source 30, and of the optical distributor, can be effected e.g. via a control unit 40 associated with internal combustion engine 10, which unit also, in known fashion, brings about metering of fuel 22 into combustion chamber 14 of cylinder 12 by application of control to injector 18.

Laser device 26 is supplied, via a light guide device 28, with laser light distributed from the optical distributor, which light serves, for example, to pump a resonator (not depicted in further detail) provided locally in laser device 26, which resonator in turn, excited by the pump laser light, generates laser pulse 24 required for ignition.

Alternatively, a laser pulse 24 provided for the ignition of fuel quantity 22 can be generated directly by centralized laser light source 30 and forwarded, via the optical distributor according to example embodiments of the present invention and via light guide device 28, to laser device 26.

Figure 2A:
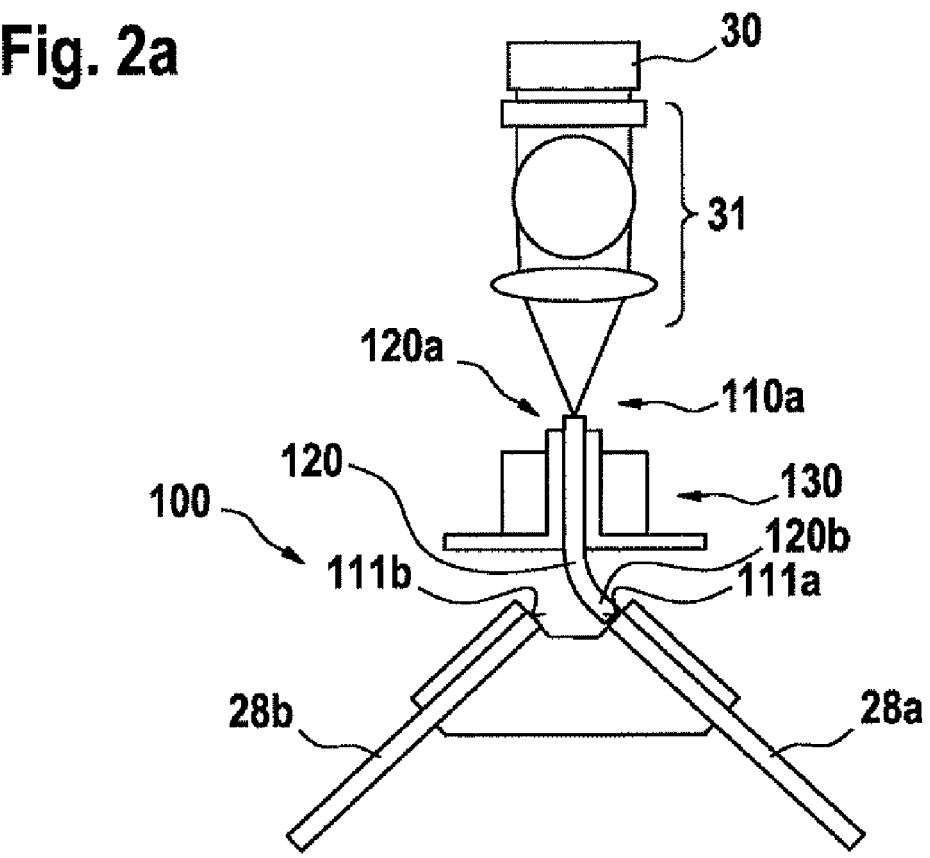
FIG. 2a is a schematically depicted partial cross section through an optical distributor according to example embodiments of the present invention, in accordance with a first example embodiment.

In both cases, the utilization of optical distributor 100 according to example embodiments of the present invention, depicted schematically in a side view in FIG. 2a, results in a significant advantage, since in total only one centralized laser light source 30 now needs to be provided, and it is not necessary to equip each cylinder 12 of internal combustion engine 10, or an associated laser device 26, for example, with a separate semiconductor laser.

The use of optical distributor 100 according to example embodiments of the present invention further makes it possible, in particularly advantageous fashion, to dispose centralized laser light source 30 (FIG. 1) remotely from an engine block of internal combustion engine 10, so that it is not directly exposed to the large temperature fluctuations and vibrations in an immediate vicinity of internal combustion engine 10.

Optical distributor 100 according to example embodiments of the present invention of FIG. 2a has a movably disposed light guide 120 whose input segment 120a simultaneously represents an optical input 110a of optical distributor 100. As is evident from FIG. 2a, an output segment 120b of light guide 120 is curved with respect to input segment 120a. This curvature is configured, in accordance with the detail view illustrated in FIG. 2b, so that a longitudinal axis E of output segment 120b of light guide 120 encloses, with a longitudinal axis D of the remaining light guide 120 or of its input segment 120a, an angle α differing from 0°.

Figure 2B:
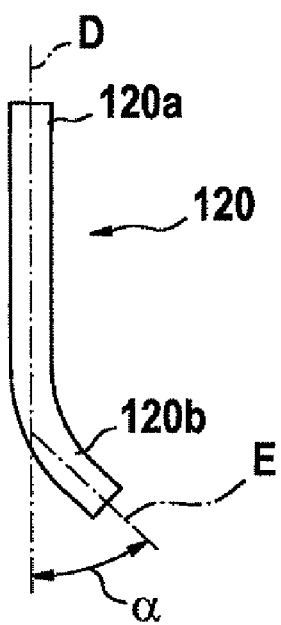

By corresponding rotation of light guide 120 about a rotation axis that is symbolized vertically in FIG. 2a by a dot-dash line and corresponds substantially to longitudinal axis D in FIG. 2b, output segment 120b, curved according to example embodiments of the present invention, of light guide 120 enables selectable optical connection of input segment 120a to a first light guide device 28a or to a second light guide device 28a, which are associated e.g. with different cylinders of internal combustion engine 10 (FIG. 1) or with their laser devices 26, and which transfer to the corresponding laser devices 26 the laser light conveyed to optical distributor 100 at its optical input 110a.

The configuration illustrated in FIG. 2a accordingly provides selectable distribution of laser light, or of other electromagnetic radiation that can be guided through light guide 120, from optical input 110a to corresponding optical outputs 111a, 111b in whose vicinity, in the present case, light guide devices 28a, 28b are disposed.

A particular advantage of the example embodiment illustrated in FIG. 2a of optical distributor 100 according to example embodiments of the present invention is that input segment 120a of light guide 120 is stationary, i.e. does not move relative to laser light source 30 or to an optical system 31 provided for coupling laser light into optical input 110a. A further advantage of the example embodiment illustrated in FIG. 2a of optical distributor 100 according to example embodiments of the present invention is that light guide 120 can be of rigid configuration, i.e. in particular does not need to be flexible and is not deformed during operation. As a result, particularly high precision in the distribution of radiant power to the various optical outputs 111a, 111b is provided, and at the same time light guide 120 is subject to a particularly low level of wear.

The rigid configuration of light guide 120 further provides the use of many different materials for the manufacture of light guide 120. For example, light guide 120 can be constituted by a conventional light-guiding fiber. In order to maintain the necessary bending angle α (cf. FIG. 2b) even over a longer operating period, a mechanical retention system (not illustrated) for light guide 120, for example in the form of a metal sleeve or the like, is advisable in this case. As an alternative thereto, however, light guide 120 can also be manufactured from glass or another mineral material that is suitable for guiding light, in a manner as intended, from input segment 120a to output segment 120b. In this case the end regions of light guide 120 can also, very advantageously, have a particular polish, for example in order to provide more efficient incoupling and outcoupling of laser light into and out of light guide 120; in other words, i.e. with such an example embodiment of light guide 120, the integration of optical elements directly into light guide 120 is possible. A combination of different materials for the configuration of light guide 120 is possible.

It is moreover very advantageous to design light guide 120 so that the light-guiding cross section in output segment 120b is slightly smaller than a light-guiding cross section of light guide devices 28a, 28b disposed in optical outputs 111a, 111b. This ensures compensation for tolerances with regard to the positioning accuracy of light guide 120 between the various working positions.

Very generally, the geometry of optical distributor 100 is to be selected so that the air gaps between light guide 120 and a light source 30 or optical system 31, or a light guide device 28a, 28b disposed in the region of optical outputs 111a, 111b, are as small as possible, in order to decrease transmission losses and thereby increase the efficiency of optical distributor 100. In principle, an evacuation of the working region around the movable light guide 120 is also possible.

Figure 2C:
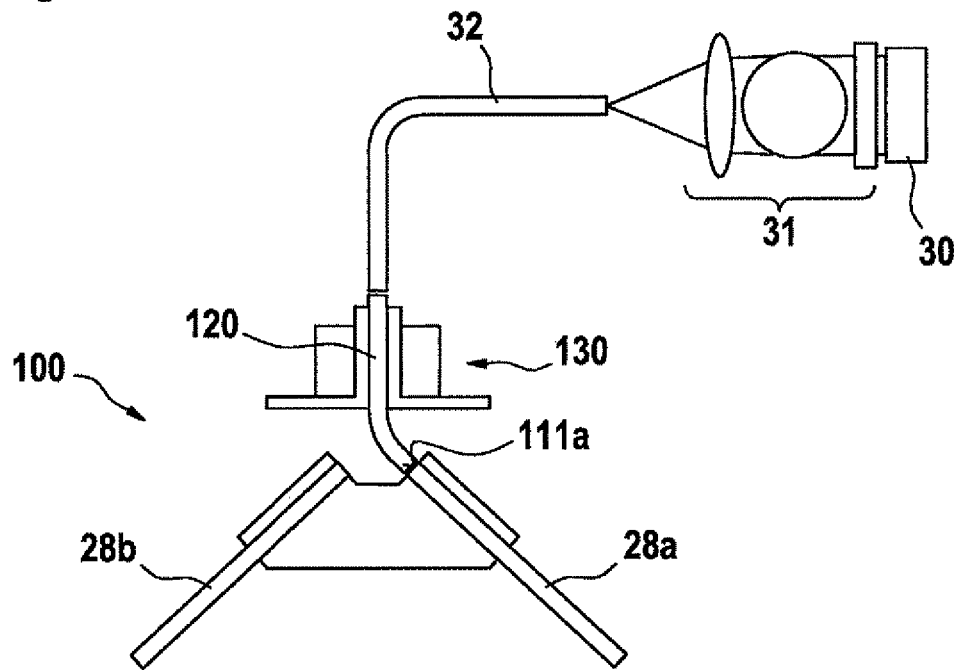
FIG. 2c shows a further example embodiment of the optical distributor.

As is evident from FIG. 2c, it is furthermore possible also to deliver the laser light on the input side to light guide 120 via a light guide device 32, for example an optical fiber or the like, instead of direct incoupling via optical system 31 as illustrated in FIG. 2a. It is thereby possible, particularly advantageously, to dispose laser light source 30 and a corresponding optical system 31 physically remotely from optical distributor 100.

For selective distribution to optical outputs 111a, 111b of the laser light delivered on the input side to optical distributor 100, a positioning member 130 is provided according to example embodiments of the present invention (cf. FIG. 2a), said member being embodied for rotation of the rotatably disposed light guide 120. Positioning member 130 can be embodied, for example, as a stepping motor, as depicted in the plan view illustrated in FIG. 3. Stepping motor 131 has an armature 133 and three magnet coils 132a, 132b, 132c acting respectively on different poles of armature 133. Magnet coils 132a, 132b, 132c can be acted upon, by way of a control application circuit (not illustrated) by different control currents, and in accordance therewith form a magnetic field that acts on armature 133 and correspondingly imparts a rotary motion thereto. Light guide 120 is disposed in shaft 134 (of hollow configuration according to example embodiments of the present invention) of armature 133, and is joined nonrotatably to armature 133. As a result, light guide 120 experiences the same rotary motion that is produced for armature 133 as a function of control application by magnet coils 132a, 132b, 132c.

In a particularly advantageous example embodiment of optical distributor 100, stepping motor 131 is embodied such that the number of its stop positions corresponds to the number of optical outputs 111a, 111b, so that by comparatively simple application of control to stepping motor 131, rapid and reliable repositioning of optical distributor 100 between the various optical outputs 111a, 111b is possible.

When optical distributor 100 is used in laser-based ignition system 27 according to FIG. 1, optical distributor 100 can have, for example, six optical outputs, each optical output being associated with an individual-cylinder laser device 2G. In this case stepping motor 131, or another positioning member, preferably also has six stop positions.

Aside from the preferably central mounting of light guide 120 on armature 133 or in shaft 134 (FIG. 3) of stepping motor 131, other configurations of stepping motors can also be used to implement positioning member 130, armature 133 of which has, for example, a particularly low rotational moment of inertia so that a particularly rapid switchover of optical distributor 100 is possible. Space-saving disk armature stepping motors or the like are usable for the implementation of positioning member 130.

A further very advantageous example embodiment of distributor 100 is illustrated in FIG. 4a.

In the example embodiment shown in FIG. 4a as well, input segment 120a of light guide 120 is stationary with reference to a laser light source 30 feeding into light guide 120. An optionally required optical system (cf. reference number 31, FIG. 1) is not illustrated in FIG. 4a for the sake of clarity.

Figure 3:
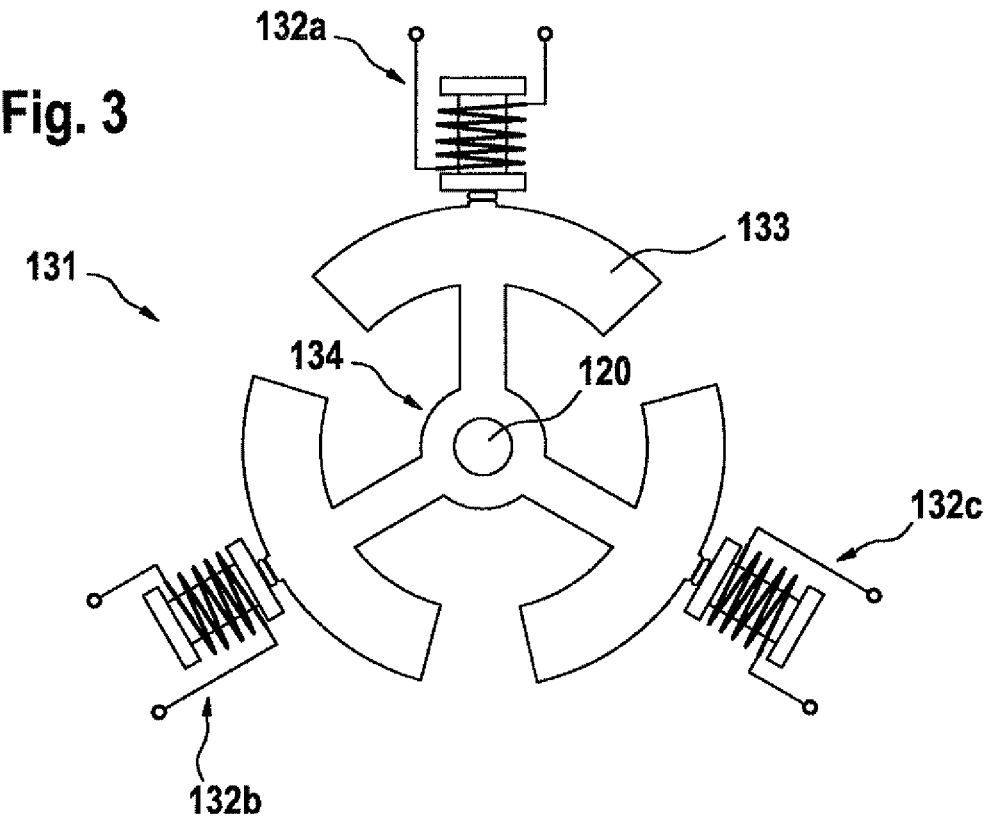
FIG. 3 is a plan view of an electromagnetic positioning member of the optical distributor according to example embodiments of the present invention.

In contrast to the example embodiments described with reference to FIGS. 2a to 3, in the example embodiment illustrated in FIG. 4a light guide 120 is not rotatably supported but is flexible. As a result, an output segment 120b of light guide 120 is movable, by the action of electromagnetic positioning member 130, relative to input segment 120a. Provided for this purpose on output segment 120b of light guide 120 is a magnetic element 125 that can have, for example, a sleeve shape and by way of which the flexible light guide 120 is slidable or connectable thereto.

By corresponding application of control to electromagnets 130a, 130b of electromagnetic positioning member 130, magnetic element 125 experiences different magnetic field forces that move magnetic element 125, and accordingly also end 120b (joined to magnetic element 125) of light guide 120, back and forth between various working positions a, b (cf. double arrow c).

In FIG. 4a, light guide 120 or its output segment 120b is located in its first working position a, so that output segment 120b of light guide 120 is located opposite an input segment of light guide device 28a that is provided for supplying a first laser device 26a with laser light pulses 24 generated by laser light source 30. The second working position b, symbolized by a light guide 120 indicated with cross-hatching in FIG. 4a, is characterized in that output segment 120b of light guide 120 is located opposite an input segment of a second light guide device 28b that is correspondingly associated with a second laser device 26b.

With the example embodiment described above, the flexible light guide 120 can be embodied, for example, as a light-guiding fiber that has a thickness between approximately 0.5 mm and approximately 1.5 mm, and that can be bent in controlled fashion by the action of positioning member 130 in order to switch between working positions a and b.

The length, symbolized in FIG. 4a by double arrow L, of the flexible light guide 120 can be, for example, approximately 20 mm to approximately 50 mm. In a preferred example embodiment of the present invention, magnetic element 125, embodied as a sleeve, has a length from approximately 2 mm to approximately 5 mm.

Light guide devices 28a, 28b for supplying the corresponding laser devices 26a, 26b can likewise be made up of light-guiding fibers having a thickness from approximately 0.6 mm to approximately 1.6 mm, the corresponding fiber ends preferably being retained in the region of optical outputs 111a, 111b, for example by way of a housing (not illustrated in FIG. 4a) or by orifices provided therein for the reception of light guide devices 28a, 28b.

In order to increase the precision of optical distributor 100 illustrated in FIG. 4a, optical outputs 111a, 111b can also be disposed directly in the region of magnetic sleeve 125, i.e. at its right end in FIG. 4a, so that in its output region 120b, light guide 120 projects only insignificantly or not at all beyond the pole shoe or shoes of controllable magnets 130b, 130b.

A particular configuration of the pole shoes of controllable magnets 130a, 130b, for example by way of a cylindrical recess, provides magnetic sleeve 125 to sit in accurately fitting fashion on the poles of the respective magnet 130a, 130b, and thus serves further to increase the precision of optical distributor 100.

In order to increase the service life of optical distributor 100, a damping layer can also be provided, for example, on the pole shoes, which layer damps an impact of sleeve 125 on the relevant pole shoe and thus, if applicable, eliminates vibrations of light guide 120.

The switchover speed of optical distributor 100 illustrated in FIG. 4a can be increased by shortening distance d between light guide devices 28a, 28b disposed fixedly on optical outputs 111a, 111b, and by energizing electromagnets 130a, 130b with correspondingly large control currents.

A further very advantageous example embodiment of optical distributor 100 is described below with reference to FIG. 4bH. In this example embodiment, magnetic element 125 is configured as a permanently magnetized element and can, for example, once again have a sleeve shape in order to enable easy mounting of magnetic element 125 on light guide 120. The permanently magnetized magnetic element 125 preferably has a radial magnetization, so that by way of a corresponding interaction of the permanent magnetic field of magnetic element 125 with the magnetic fields of electromagnetic positioning member 130 or its controllable magnets 130a, 130b, the dynamics upon switchover of optical distributor 100 between its working positions a, b can be improved.

For the switchover of optical distributor 100 from its first working position a, in which an output segment 120b of light guide 120 is located in the region of first optical output 111a, into its working position b, electromagnet 130a is energized, for example, so that magnetic element 125 is repelled from electromagnet 130a, while controllable electromagnet 130b is energized so that it attracts magnetic element 125.

With the example embodiment of optical distributor 100 illustrated in FIG. 4b, the pole shoes of electromagnets 130a, 130b can likewise advantageously have a shape adapted to the external shape of magnetic sleeve 125. In addition, lugs (not shown) can be provided in the region of the pole shoes of electromagnets 130a, 130b for the retention of magnetic sleeve 125 in the first or the second working position a, b, respectively.

Figure 5A:
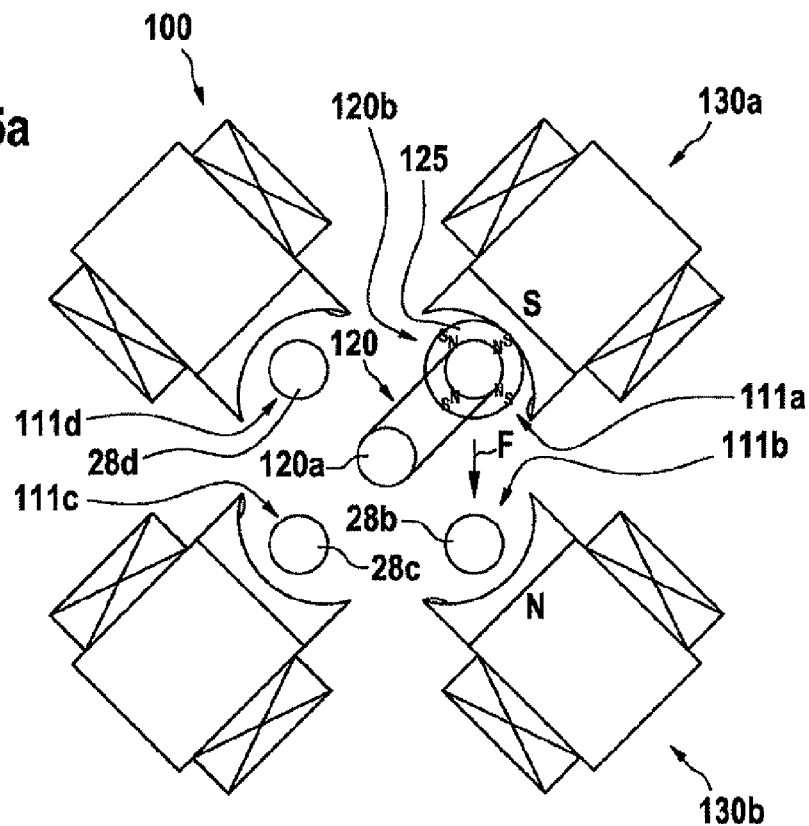

FIG. 5a is a plan view of optical distributor 100 already described with reference to FIG. 4b.

Disposed centrally in optical distributor 100 is flexible light guide 120, whose cross-sectional surface pertinent to its input segment 120a protrudes from the drawing plane of FIG. 5a. In addition to optical outputs 111a, 111b already visible in FIG. 4b, optical distributor 100 as shown in FIG. 5a has two further optical outputs 111c, 111d. Associated with each optical output 111a, 111b, 111c, 111d is a stationary light guide device 28a, 28b, 28c, 28d from which corresponding laser devices are supplied. The first stationary light guide device 28a (FIG. 4b) is not apparent in the plan view of FIG. 5a, since light guide 120 is in its first working position a; in other words, output segment 120b of light guide 120 is located in the region of optical output 111a, such that output segment 120b of light guide 120 lies directly opposite the input cross-sectional surface of the stationary light guide device 28a, and provides a distribution of laser light to light guide device 28a.

In FIG. 5a, the permanently magnetized sleeve 125 is visible in its working position, in which it rests in a shape-adapted region of the pole shoe of the controllable electromagnet 130a. As is evident from FIG. 5a, magnetic sleeve 125 is permanently magnetized in such a way that the magnetic south pole S is located in a radially outer region, and the magnetic north pole N in a radially inner region.

In order to move output segment 120b of light guide 120, the first controllable electromagnet 130a (as illustrated in FIG. 5a) has control applied to it such that its pole shoe receiving magnetic sleeve 125 constitutes a magnetic south pole S, and accordingly exerts a repulsive force on magnetic sleeve 125 and on output segment 120b of light guide 120 connected to it. The second controllable electromagnet 130b, on the contrary, has control applied to it for this purpose in such a way that its pole shoe configured to receive magnetic sleeve 125 has a magnetic north pole N, i.e. acts attractively on the outer region of the permanently magnetized sleeve 125. The overall result of this, as indicated by arrow F in FIG. 5a, is a force, pointing from top to bottom, on output segment 120b of light guide 120 so that light guide 120 is correspondingly bent, with the ultimate result that the permanently magnetized sleeve 125 comes to rest on the shape-adapted pole shoe of the second controllable electromagnet 130b. In this state, laser light delivered on the input side to light guide 120 is delivered to second optical output 111b and thus to light guide device 28b.

By corresponding application of control to controllable electromagnets 130a, 130b and to the further two controllable electromagnets not characterized further in FIG. 5a, a back-and-forth movement of the permanently magnetized sleeve 125, and thus of output segment 120b of light guide 120, between various working position is possible, so that rapid and reliable distribution of laser light to the various optical outputs 111a, 111b, 111c, 111d can be effected.

Figure 5B:
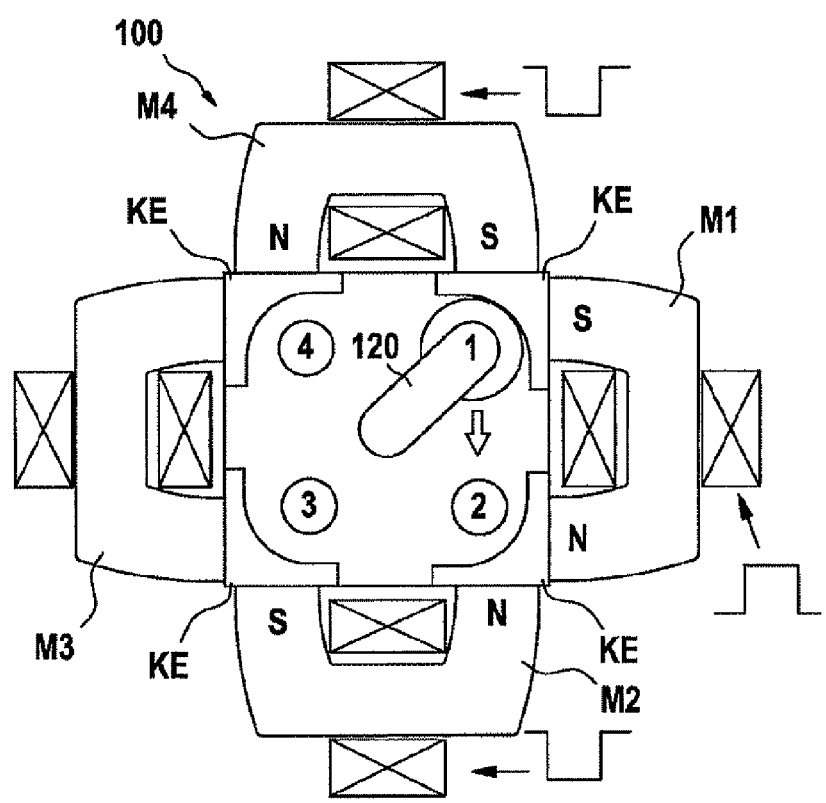

FIG. 5b indicates a further variant in which a disposition of electromagnets M1, M2, M3, M4 that is modified by comparison with FIG. 5a results in a closed magnetic circuit between the pole shoes of the individual electromagnets. The magnetically conductive coupling elements KE between the respective electromagnets M1, M2, M3, M4 are provided, in particular, for this purpose.

In order to move light guide 120 out of its first working position labeled "1" in FIG. 5b into a working position labeled "2", electromagnets M1, M2, and M4 have control applied to them as symbolized in FIG. 5b by the pulses indicated, thus resulting in the magnetic field configuration illustrated. Because control is not applied to electromagnet M3 in this case, a closed magnetic circuit can be constituted through electromagnets M1 to M4 and coupling elements KE that connect them.

Application of control to electromagnets M1 to M4, and to the further electromagnetic positioning members 130 that have been described, can be accomplished in a manner known per se by way of semiconductor switches that can be disposed, for example, in a full-bridge configuration in order to permit a polarity change upon control application. Alternatively or additionally, the windings of the electromagnets can also have a center tap in order to generate magnetic fluxes of differing signs in the relevant electromagnet, by alternating operation of the half-windings thereby formed.

In addition to a simple rotation (FIG. 2a) or flexion (FIG. 4a) of the light guide 120, a combination of the two positioning operations is also conceivable; a correspondingly configured positioning member 130, or multiple positioning members, are to be made available in this context. As an alternative to the use of stepping motors, electromagnetically operating linear drives and the like can also be used, for example, to bend or move light guide 120. It is also conceivable to use, for example, pneumatic or piezoelectric positioning members instead of electromagnetic positioning members.

When optical distributor 100 is used in a laser-based ignition system 27 of an internal combustion engine 10, light guide devices 28a, 28b, . . . can advantageously be disposed in a circle shape and so as to correspond to an ignition sequence of cylinders 12 of internal combustion engine 10, so that a cyclical rotation of light guide 120 to the corresponding light guide device 28a, 28b, . . . is sufficient, with minimal positioning movements, to maintain the ignition sequence. Instead of the distribution of laser light it is of course also possible, depending on the configuration of light guide 120, to distribute non-coherent light using optical distributor 100 of the present invention. An inverse operation of optical distributor 100 is also possible, in which multiple light guide devices disposed in the regions labeled here as an optical output 111a, 111b, . . . deliver to optical distributor 100 radiant power that, by the positioning of light guide 120 into a predefinable working position a, b, is forwarded selectively to the region labeled in this case as optical input 110a.

In an advantageous example embodiment, it is furthermore possible to provide more than one movable light guide 120 in optical distributor 100, so that, for example, laser light delivered on the input side can be distributed simultaneously to multiple different optical outputs. It is likewise possible to integrate a beam splitter into light guide 120, so that laser light delivered on the input side to light guide 120 is allocated to two output segments of light guide 120 that result therefrom, and is forwardable simultaneously to different optical outputs of the optical distributor.

Figure 6:
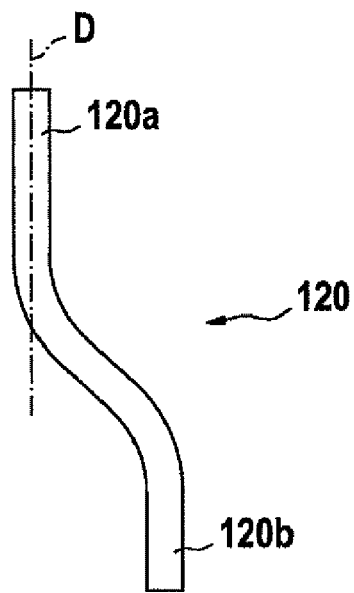
FIG. 6 is a further detail view of a movable light guide.

In a further very advantageous example embodiment of optical distributor 100, light guide 120 has an output segment 120b parallel to its input segment 120a (cf. FIG. 6). With a light guide 120 configured in this fashion, it is advantageously possible to install light guide devices 28, 28a, 28b, provided on the output side, in space-saving fashion parallel to one another, and not radially as illustrated in FIG. 2a. In order to distribute light to light guide devices 28, 28a, 28b (not illustrated in FIG. 6) provided on the output side, light guide 120 is to be rotated as shown in FIG. 6 by a positioning member about its axis D, i.e. no deformation of light guide 120 is necessary, with the result that light guide 120 is subject to a particularly low level of wear.

In addition to a preferably centered disposition of a segment of light guide 120 in a rotor of a stepping motor used as a positioning member, it is also possible to apply control to light guide 120, for example, via a belt drive or a toothed rack driven, for example, by way of a linear positioning member. In both cases, a corresponding belt pulley or tooth set can be shaped directly onto light guide 120. When light guide 120 is configured from plastic, such drive means can be shaped, particularly easily, directly onto light guide 120.

In addition to an integral configuration, light guide 120 can also encompass a combination of different (optical) materials.

The invention claimed is:

1. An optical distributor for distribution of light between at least one optical input and at least one of several optical outputs, comprising:
    at least one movably disposed light guide; and
    a positioning member adapted to move the at least one light guide, the light guide being movable by the positioning member such that at least one of the optical inputs is connectable via the light guide to at least one of the optical outputs;
    wherein an output segment of the light guide includes a cross-section smaller than a cross-section of the at least one of the optical outputs.

2. The optical distributor according to claim 1, wherein the light includes laser light.

3. The optical distributor according to claim 1, wherein an input segment of the light guide is stationary.

4. The optical distributor according to claim 3, wherein an output segment of the light guide is curved with respect to the input segment such that a longitudinal axis of the output segment encloses, with a longitudinal axis of one of (a) the remaining light guide and (b) of the input segment, an angle differing from 0°.

5. The optical distributor according to claim 1, wherein the light guide is supported rotatably.

6. The optical distributor according to claim 1, wherein the light guide is flexible.

7. The optical distributor according to claim 1, wherein an output segment of the light guide is movable relative to an input segment of the light guide.

8. The optical distributor according to claim 1, wherein an output segment of the light guide is movable relative to an input segment of the light guide by flexion of the light guide.

9. The optical distributor according to claim 1, wherein the positioning member is at least one of (a) an electromagnetic positioning member, (b) a stepping motor, and (c) a linear drive.

10. The optical distributor according to claim 9, wherein the positioning member has at least one of (a) a controllable magnet and (b) an electromagnet; and a magnetic element is disposed on at least one segment of the light guide.

11. The optical distributor according to claim 10, wherein the magnetic element includes at least one of (a) a permanently magnetized sleeve and (b) a permanently magnetized sleeve magnetized radially.

12. A laser-based ignition system for an internal combustion engine, comprising:
    a centralized laser light source;
    multiple decentralized laser devices, each associated with different cylinders of the internal combustion engine; and
    an optical distributor for distribution of laser light between the centralized laser light source and the decentralized laser devices, the distributor including:
        at least one movably disposed light guide; and
        a positioning member adapted to move the at least one light guide, the light guide being movable by the positioning member such that the light source is connectable via the light guide to the laser devices;
        wherein an output segment of the light guide includes a cross-section smaller than a cross-section of the laser devices.

13. A method for operating an optical distributor for distribution of light between at least one optical input and at least one of several optical outputs, comprising:
    providing at least one movably disposed light guide which is moved by a positioning member such that at least one predefinable optical input is connected via the light guide to at least one predefinable optical output;
    wherein an output segment of the light guide includes a cross-section smaller than a cross-section of the at least one predefinable optical output.

14. The method according to claim 13, wherein the light includes laser light.

15. The optical distributor according to claim 1, further comprising a damping element configured to damp vibrations of the light guide.

16. The optical distributor according to claim 1, wherein an output segment of the light guide is movable relative to an input segment of the light guide by a combination of rotation and flexion of the light guide.

17. The optical distributor according to claim 1, wherein the light guide includes at least two output segments and a beam splitter configured to simultaneously direct light to the at least two output segments.

18. The optical distributor according to claim 1, wherein the light guide includes a belt pulley configured to be driven by a belt drive.

19. The optical distributor according to claim 1, wherein the light guide includes a tooth set configured to be driven by a toothed rack.

* * * * *